(12) United States Patent
Robello et al.

(10) Patent No.: US 8,119,328 B2
(45) Date of Patent: Feb. 21, 2012

(54) IMAGING ELEMENT AND METHOD USING DIFFERENTIAL LIGHT SCATTERING

(75) Inventors: Douglas R. Robello, Webster, NY (US); Mark R. Mis, Hornell, NY (US)

(73) Assignee: Eastman Kodak Company, Rochester, NY (US)

( * ) Notice: Subject to any disclaimer, the term of this patent is extended or adjusted under 35 U.S.C. 154(b) by 769 days.

(21) Appl. No.: 12/189,239

(22) Filed: Aug. 11, 2008

(65) Prior Publication Data
US 2010/0035176 A1   Feb. 11, 2010

(51) Int. Cl.
*G03F 7/105* (2006.01)
*G03F 7/004* (2006.01)

(52) U.S. Cl. ..................... 430/290; 430/270.1

(58) Field of Classification Search ............... 430/270.1, 430/290
See application file for complete search history.

(56) References Cited

U.S. PATENT DOCUMENTS

| | | | |
|---|---|---|---|
| 5,372,745 A * | 12/1994 | Yoshinaga et al. | 252/299.01 |
| 6,569,600 B2 | 5/2003 | Dinnocenzo et al. | 430/270.15 |
| 6,969,578 B2 | 11/2005 | Robello et al. | 430/270.14 |
| 7,022,392 B2 | 4/2006 | Dinnocenzo et al. | 428/64.1 |
| 2004/0175656 A1 | 9/2004 | Baer et al. | 430/290 |
| 2005/0136357 A1 | 6/2005 | Farid et al. | 430/270.11 |
| 2008/0017864 A1 * | 1/2008 | Choung et al. | 257/72 |
| 2008/0182958 A1 * | 7/2008 | Lafleur et al. | 526/317.1 |

FOREIGN PATENT DOCUMENTS

| WO | WO 2004/084204 A2 | 9/2004 |
|---|---|---|
| WO | WO 2005/010877 A1 | 2/2005 |

OTHER PUBLICATIONS

C. P. Pinazzi, A. Fernandez—Synthesis of New Photocrosslinkable Polymers Derived from Cinnamic Acid, pp. 37-51, ACS Symposium Series, American Chemical Society, Washington DC—published on Jun. 1, 1976.*

Seiichiro Murase et al., "Photo-optical Control with Large Refractive Index Changes by Photodimerization of Poly(vinyl cinnamate) Film", *Macromolecules* 1997, 30, 8088-8090, 1997 Am Chem Soc.

* cited by examiner

*Primary Examiner* — Anca Eoff
(74) *Attorney, Agent, or Firm* — J. Lanny Tucker

(57) ABSTRACT

An imaging element is used to provide images based on the difference in index of refraction caused by imaging actinic radiation. Imaging provides desired results by the creation or elimination of light scattering in a two-phase imaging medium in which at least one phase contains a material that is capable of having a refractive index change in response to imaging actinic radiation. For example, if the refractive indices of the two phases are initially matched, imaging can cause a mismatch in imaged regions. Alternatively, the refractive indices of the two phases can be initially mismatched and imaging can create a match of refractive indices in imaged regions. An image can be produced using a controlled amount of imaging actinic radiation without any chemical processing or heating.

19 Claims, 2 Drawing Sheets

IMAGING ELEMENT AND METHOD USING DIFFERENTIAL LIGHT SCATTERING

FIELD OF THE INVENTION

This invention relates to an imaging element that provides an image from a change in refractive index that occurs in the imaging layer as a result of irradiation by actinic radiation. It also relates to a method of providing an image using the imaging element.

BACKGROUND OF THE INVENTION

Small particles (particulate phase) embedded within and having a different refractive index ($\eta$) than a continuous phase or matrix can cause light passing through the continuous phase to scatter. Milk is a common example of this phenomenon. However, if the indices of refraction of the particles and continuous phase approximately equal, the entire medium appears to be transparent. More specifically, the amount of light scattering in such a medium depends upon the contrast in ($\eta$) between the two phases, the size distribution and concentration of the particles, and the thickness (optical path) of the medium.

Murase et al. (*Macromolecules* 1997, 30, 8088-8090) describe creating a change in refractive index by photodimerization of poly(vinyl cinnamate) films.

U.S. Pat. No. 6,569,600 (Dinnocenzo et al.) describes optical recording materials that when exposed to actinic radiation, produce a change in optical properties in the exposed regions, thereby providing an image or stored data. These results can be achieved by using organic materials that are altered by exposure to actinic radiation and through one electron oxidation, cause the desired change in optical properties. Such organic materials can be changed by isomerization reaction such as cyclizations, cycloadditions, and cycloreversions, and are disposed within a suitable organic polymeric matrix. The changes in optical properties are useful for recording holograms, diffraction gratings, and waveguides. There is no indication that the index of refraction of the organic materials should be chosen with a specific relationship to the index of refraction of the polymeric continuous phase.

Problem to be Solved

There is a need for improved imaging media that can utilize known reactive chemicals in a more efficient manner and in which the image is controlled by effective use of differential light scattering by various components in the imaging composition.

SUMMARY OF THE INVENTION

This invention provides an imaging element comprising a layer comprising:

a polymeric binder that is substantially transparent to incident actinic radiation and thus has an index of refraction that is unchangeable as a result of exposure to the incident actinic radiation, the polymeric binder comprising a continuous phase, a particulate material comprising a reactant, the particulate material being dispersed within the polymeric binder and that:

a) has an index of refraction that is substantially the same as that of the polymeric binder before exposure to the incident actinic radiation, and upon exposure to the incident actinic radiation, the index of refraction of the particulate material becomes substantially different from that of the polymeric binder, or b) has an index of refraction that is substantially different from that of the polymeric binder before exposure to the incident actinic radiation, and upon exposure to the incident actinic radiation, the index of refraction of the particulate material becomes substantially the same as that of the polymeric binder, that is capable of producing an optically detectable image from differential light scattering in the layer.

This invention also provides a method of producing an image comprising:

imagewise exposing an imaging element to imaging actinic radiation, the imaging element comprising a layer comprising:

a polymeric binder that is substantially transparent to incident actinic radiation and thus has an index of refraction that is unchangeable as a result of exposure to the incident actinic radiation, the polymeric binder comprising a continuous phase, a particulate material comprising a reactant, the particulate material being dispersed within the polymeric binder and that:

a) has an index of refraction that is substantially the same as that of the polymeric binder before exposure to the incident actinic radiation, and upon exposure to the incident actinic radiation, the index of refraction of the particulate material becomes substantially different from that of the polymeric binder, or b) has an index of refraction that is substantially different from that of the polymeric binder before exposure to the incident actinic radiation, and upon exposure to said incident actinic radiation, the index of refraction of the particulate material becomes substantially the same as that of the polymeric binder, to provide exposed and non-exposed regions in the layer so as to provide a difference in index of refraction between the exposed and non-exposed regions.

The present invention provides desired results by the creation or elimination of light scattering in a two-phase imaging medium in which at least one phase contains a material that is capable of having a refractive index change in response to imaging actinic radiation. For example, if the refractive indices of the two phases are initially matched, imaging can cause a mismatch in refractive indices in imaged regions. Alternatively, if the refractive indices of the two phases are initially mismatched, imaging can create a match of refractive indices in imaged regions. Thus, an image can be produced using a controlled amount of imaging actinic radiation without any chemical processing or heating.

The present invention can be useful, for example, for security printing, optical devices, detection of ionizing radiation, and detection of UV radiation.

DETAILED DESCRIPTION OF THE INVENTION

Definitions

As used herein, the term "matched" in reference to indices of refraction refer to two phases having substantially the same indices of refraction, that is the difference in η of no more than 0.005.

As used herein, the term "mismatched" in reference to indices of refraction refer to two phases having substantially different indices of refraction, that is the difference in η of greater than 0.02.

As used herein, unless otherwise noted, the term "imaging element" refers to embodiments of the present invention.

The layer used for imaging can also be referred to as the "imaging layer".

Imaging Elements

The imaging elements of this invention include two phases, for example a particulate phase dispersed in a continuous polymeric binder in which the two phases have different refractive indices prior to imaging irradiation, or they have the same refractive indices prior to imaging irradiation. Any imaging chemistry can be used for the two phases as long as they will produce the change in refractive indices (matched or mismatched) upon exposure to actinic radiation. In such instances, either or both phases can have a change in index of refraction.

In most embodiments of this invention, the two-phase imaging chemistry used in the imaging elements include sensitizers (defined below) that are capable of absorbing incident actinic radiation that initiates a chemical reaction, for example by one electron oxidation, of a reactant that is dispersed within the continuous polymeric phase. This photochemical reaction causes the needed substantial change in the index of refraction of particulate material dispersed within the continuous phase.

In other embodiments, exposure by actinic radiation initiates a chemical reaction with a reactant (defined below) to cause a substantial change in the index of refraction without the need for a sensitizer.

Thus, in some embodiments, the components of the layer used for imaging have essentially the same index of refraction and exposure to actinic radiation causes a difference in index of refraction between said particulate material and the polymeric binder of at least 0.02.

In other embodiments, before exposure to actinic radiation, the difference in index of refraction between the particulate material and the polymeric binder are already different by at least 0.02 and exposure to the actinic radiation reduces the difference so that the indices of refraction are essentially the same.

Figure 1:
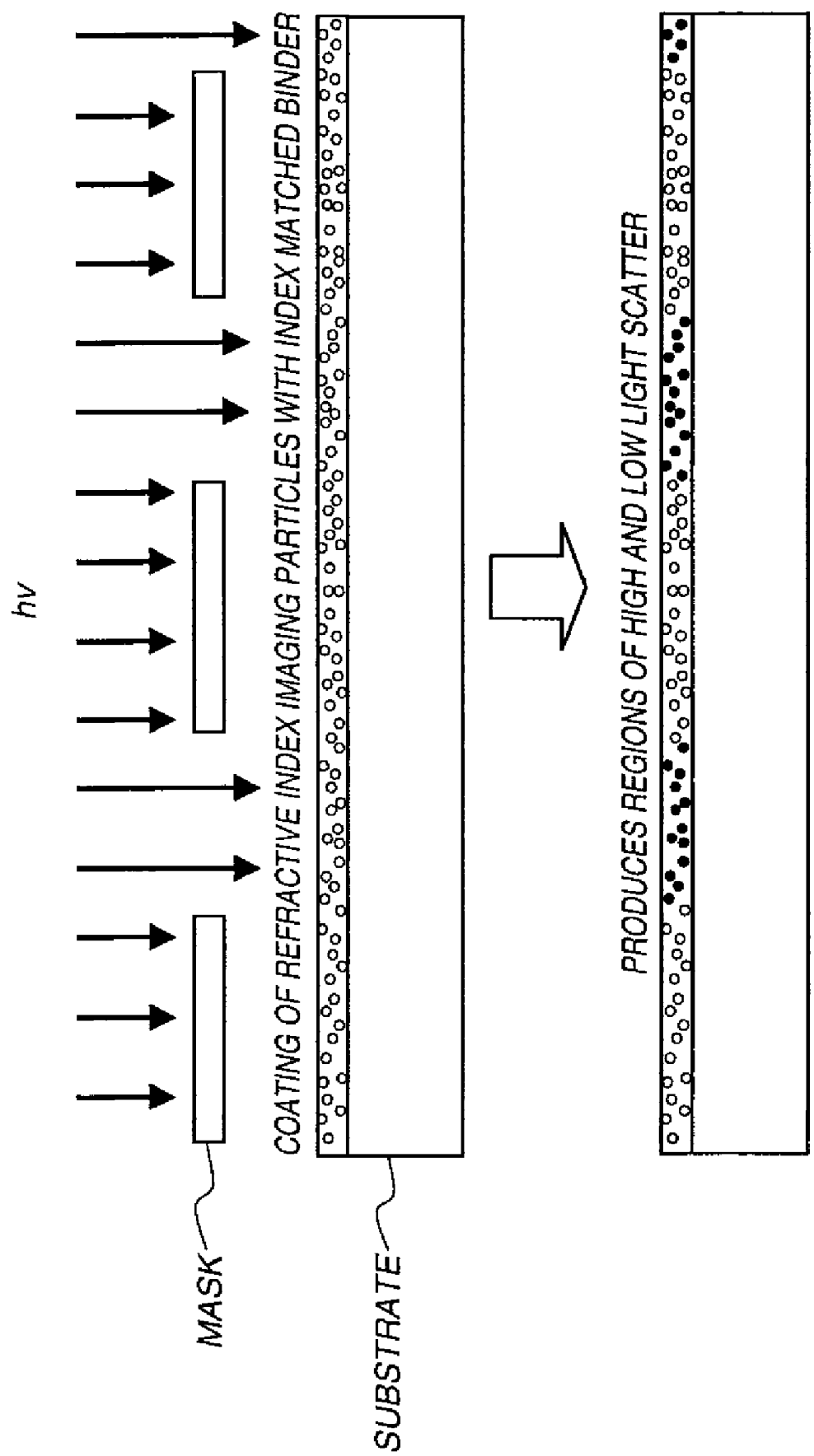
FIG. 1 is a graphical illustration of an imaging scheme using an imaging element wherein the refractive indices of the two phases are substantially the same before imaging, for example as carried out in Example 1 below.

One embodiment of the invention is illustrated in FIG. 1 in which an imaging element of this invention is imaged with actinic radiation through a mask. The imaging element has a layer containing a particulate material dispersed within a polymer binder that is disposed on a substrate. The particulate material and polymer binder have essentially the same index of refraction prior to exposure but the imaged areas are shown to have a significant difference in indices of refraction.

The particulate material containing the reactant is generally present in the imagable element, for example, in an imaging layer, in an amount of from about 1 to about 50% or typically from about 10 to about 30%, based on total dry weight.

Chemical transformation of the reactant is generally an isomerization including such reactions as cyclizations, cycloadditions, or cycloreversions. General examples of such transformations are the interconversions between 1a and 1b, or 2a and 2b shown as follows:

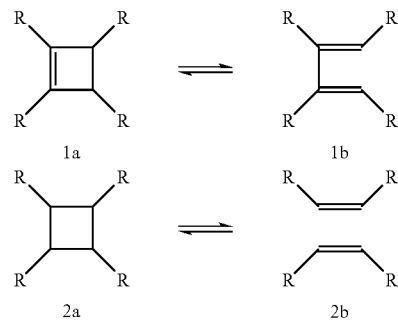

wherein R in the structures can be hydrogen or a substituted or unsubstituted alkyl or alkoxy groups having 1 to 12 carbon atoms (both linear or branched groups), substituted or unsubstituted cycloalkyl groups having 5 to 10 carbon atoms in the saturated carbon ring (such as cyclopentyl, cyclohexyl, 4-methylcyclohexyl, and cyclooctyl), substituted or unsubstituted aryl groups having 6 to 18 atoms in the aromatic ring (such as phenyl, naphthyl, anthryl, or phenanthryl), cyano, carboxylate, halogen, ketone, an ester, or a substituted or unsubstituted heteroaromatic group (such as furyl, thienyl, pyridyl, benzofuryl, and benzothienyl). Substituents on the aryl or heteroaryl groups can include but are not limited to, alkyl, aryl, alkoxy, aryloxy, thioalkyl, and thioaryl groups. In addition, two or more R groups can be joined together to form additional fused rings.

Examples of 1a/1b reactions carried out in the presence of a sensitizer include, but are not limited to:

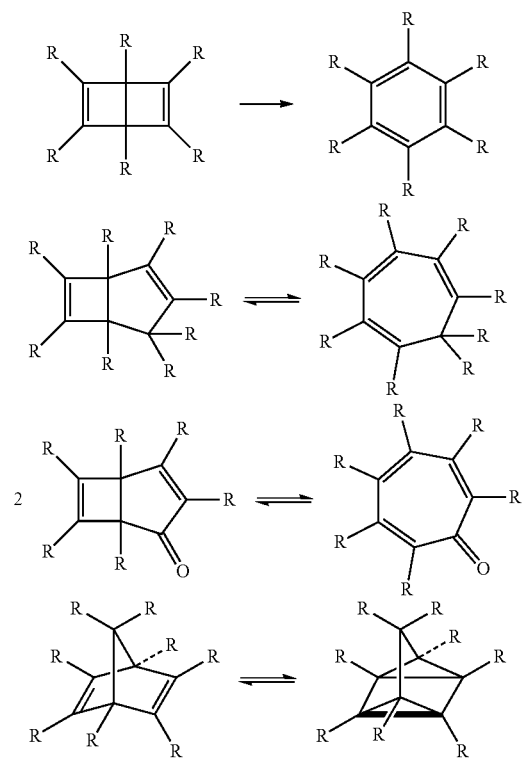

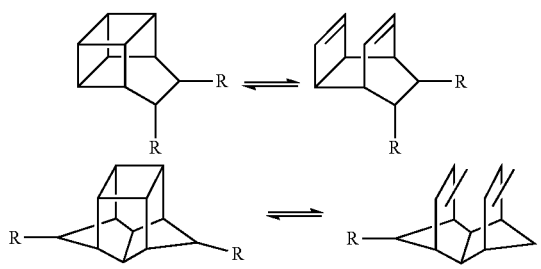
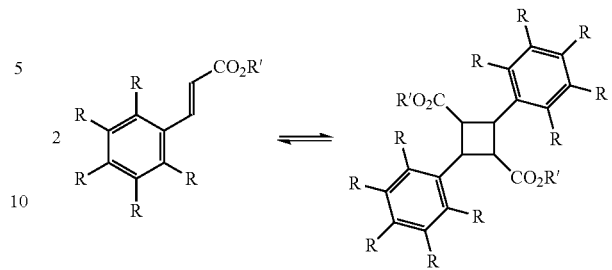
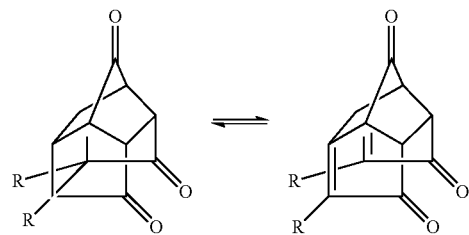
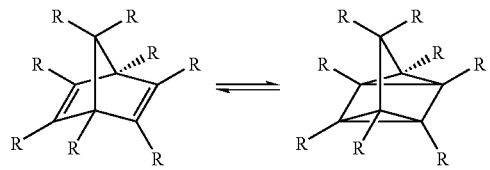
wherein R is a defined above, and
R' represents hydrogen, a substituted or unsubstituted alkyl, substituted or substituted cycloalkyl, or substituted or unsubstituted aromatic or heteroaromatic group, which groups are defined similar to those for R.
Reactions that can be carried out without the use of a sensitizer include, but are not limited to:
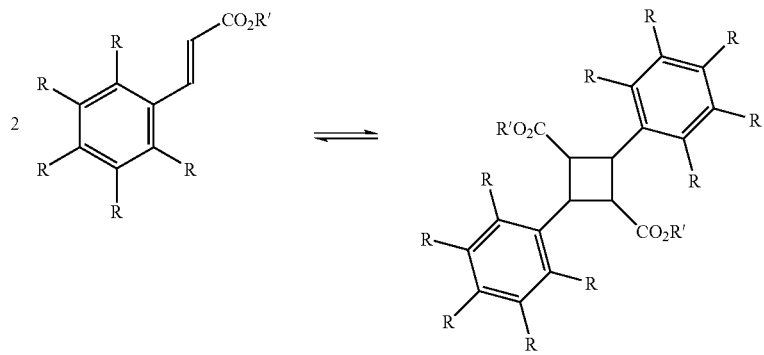
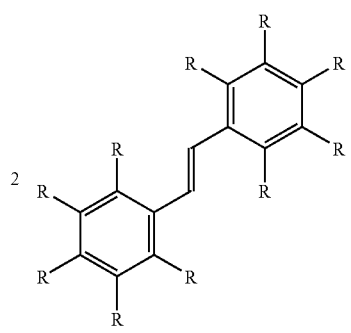
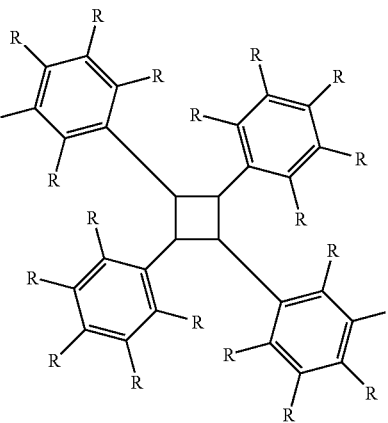
or

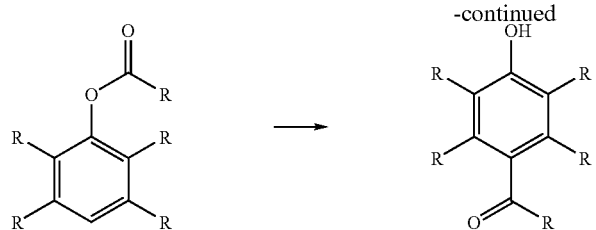
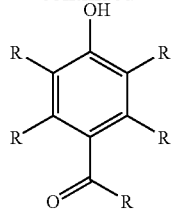

wherein R and R' are as defined above.

Useful examples of reactants are described as Compound R-1 through R-13 in U.S. Pat. No. 6,569,600 (noted above) that is incorporated herein by reference with respect to these compounds and their sources.

In their simplest form, small particles of the reactant (typically 1 to 10 μm in diameter) are formed using known dispersion techniques. The particles can be small molecules or polymers including crosslinked polymers that can be suspended in a variety of solvents and other polymer without being dissolved.

In many embodiments, the reactant is selected so that its oxidation potential is less than that of its product, and that a suitably rapid isomerization can occur upon electron transfer to a sensitizer (described below). The compounds listed above possess these characteristics, but other (as yet unidentified) compounds that share the same properties and that would function equally well or better than those listed above may exist.

The sensitizers used in most embodiments initiate the chemical transformation of the reactant. Some sensitizers are capable of oxidizing the reactant to a radical cation after the sensitizer has absorbed actinic radiation (that is, photoinduced electron transfer). Other sensitizers are capable of exciting the reactants to their triplet state.

One class of useful sensitizers that is capable of absorbing an electron from the reactant. Representative compounds of this type and their synthesis are shown in Tables 2 and 3 of U.S. Pat. No. 6,569,600 (noted above) that is also incorporated herein for the description of these compounds. For example, the compounds listed in Table 2 are useful with hexamethyldewarbenzene as the reactant.

U.S. Pat. No. 6,569,600 (Col. 7, line 49 to Col. 8, line 39) also provides further mechanistic definitions of the compounds that may be useful as sensitizers.

For example, useful electron transfer sensitizers for various reactants include cyanoaromatic compounds (such as 1-cyanonaphthalene, 1,4-dicyanonaphthalene, 9,10-dicyanoanthracene, 2,9,10-tricyanoanthracene, and 2,6,9,10-tetracyanoanthracene), aromatic anhydrides or imides (such as 1,8-naphthylene dicarboxylic, 1,4,6,8-naphthalene tetracarboxylic, 3,4-perylene dicarboxylic, and 3,4,9,10-perylene tetracarboxylic anhydride or imide), condensed pyridinium salts (such as quinolinium, isoquinolinium, phenanthridinium, and acridinium salts), pyrylium salts, thiapyrilium salts, and cyanine dyes. Also useful sensitizers that involve the triplet excited state are carbonyl compounds such as quinones (such as benzo-, naphtha-, anthroquinones) with electron withdrawing substituents (such as chloro and cyano groups), aromatic ketones such as benzophenone, xanthone derivatives, and thioxanthone derivatives. Ketocoumarin derivatives having strong electron withdrawing moieties such as pyridinium can also be used as sensitizers.

The various sensitizers shown in Table 3 of U.S. Pat. No. 6,569,600 can have various substituents such as alkyl groups, alkoxy groups, chloro, and phenyl groups to modify various properties such as solubility, absorption spectra, and reduction potential.

In other embodiments, the sensitizers upon absorption of the actinic radiation fragments give an oxidant capable of accepting an electron from the reactant. Examples of such compounds and their synthesis are provided in Table 4 of U.S. Pat. No. 6,569,600 (noted above) that is also incorporated herein for the description of these compounds. A particular example of this type of sensitizer is N-methoxyphenanthridinium as illustrated in Col. 13, of the noted patent.

Useful sensitizers are also described in U.S. Patent Application Publication 2005/0136357 (Farid et al.), for example in Table 2, all of which are incorporated herein by reference.

One or more sensitizers are present in said layer in an amount of from about 0.01 to about 10%, or typically from about 0.5 to about 3%, based on total dry layer weight.

The particulate material (and sensitizer if present) can be dispersed within one or more suitable polymeric binders using a suitable solvent (see below). Examples of suitable polymeric binders include but are not limited to, poly(alkyl methacrylates), poly(alkyl acrylates), polystyrenes, polycarbonate, cellulose acetate, poly(vinyl alcohols), synthetic and naturally-occurring gelatins, and poly(vinyl butyral). For example, a gelatin or poly(vinyl alcohol) is useful, as well as mixtures thereof. The polymeric binder is chosen to be optically transparent in the spectral region where the sensitizer (if present) absorbs. That is, the polymeric binder or mixtures thereof should not have significant absorption at the excitation wavelengths and should not interfere with the chemical transformation of the reactant. Plasticizers or preservatives may also be dispersed within the polymeric binder. The binder index of refraction should match that of the reactant either before or after exposure to actinic radiation.

Thus, the polymeric binder, reactant, and sensitizer (if present) can be formulated into a layer (that is, imaging layer) that is used to form an image. This layer may be self-supporting in the form of a slab or disk, but more likely it is coated or disposed on a support that can be composed of a suitable glass, ceramic, polymer, metal, or paper (such as a resin-coated paper). Useful polymeric supports include polyester, polystyrene, or cellulose acetate films, such as poly(ethylene terephthalate) and poly(ethylene naphthalate) films. The surface of the support may be suitably treated or coated with a subbing material (such as a hydrolyzed vinyl chloride-vinyl acetate copolymer) to improve adhesion to the layer used for imaging.

The components described herein can be formulated to form an imaging layer using known dispersion technology (for example, see U.S. Pat. No. 4,833,060 of Nair et al.).

In general, an imaging layer formulation can be prepared by dispersing a particulate reactant and sensitizer (if used) in a suitable organic solvent to form a solution of from about 25 to about 95% reactant. In some embodiments, the reactant is in a liquid form and the organic solvent is not necessary, and thus, the sensitizer can be dissolved within the reactant. This reactant solution is mixed with an aqueous surfactant solution (typically 50-90 weight % water), and the resulting dispersion is homogenized to provide reactant particles in the aqueous phase. If an organic solvent was used, it can be removed using known techniques. One or more hydrophilic polymeric binders are then added in an aqueous solution (typically 10 to 50 weight % polymer), generally at a weight ratio of 1:2 to 2:1 of binder solution to reactant solution.

The layer used for imaging may have a thickness of from about 1 µm to about 1 cm, and typically has a thickness of from about 100 to about 1000 µm.

The layer used for imaging can be overcoated with a protective layer to provide abrasion resistance, antistatic properties, impermeability to oxygen, and to protection from light (for example with a filter dye).

The following Examples are provided to illustrate the present invention but the invention is not to be interpreted as so limited.

EXAMPLE 1

An imaging element of this invention was prepared in which the reactant and polymeric binder had essentially the same index of refraction before exposure to actinic radiation.

The following imaging layer formulation was prepared and coated on a poly(ethylene terephthalate) substrate to provide a dry coating of about 40 g/m$^2$ and the amounts are the weight in the resulting dry imaging layer:

Tetramethyldimethylesterdewarbenzene as reactant (480 mg, 31.1% weight), 1-methoxyxanthen-9-one as sensitizer (4.8 mg, 0.30% weight), Oxidized gelatin as binder (1 g, 66.0% weight), Sodium alkylnaphthalene sulfonate surfactant (40 mg, 2.6 weight %), and 17.4 g of water.

Figure 2:
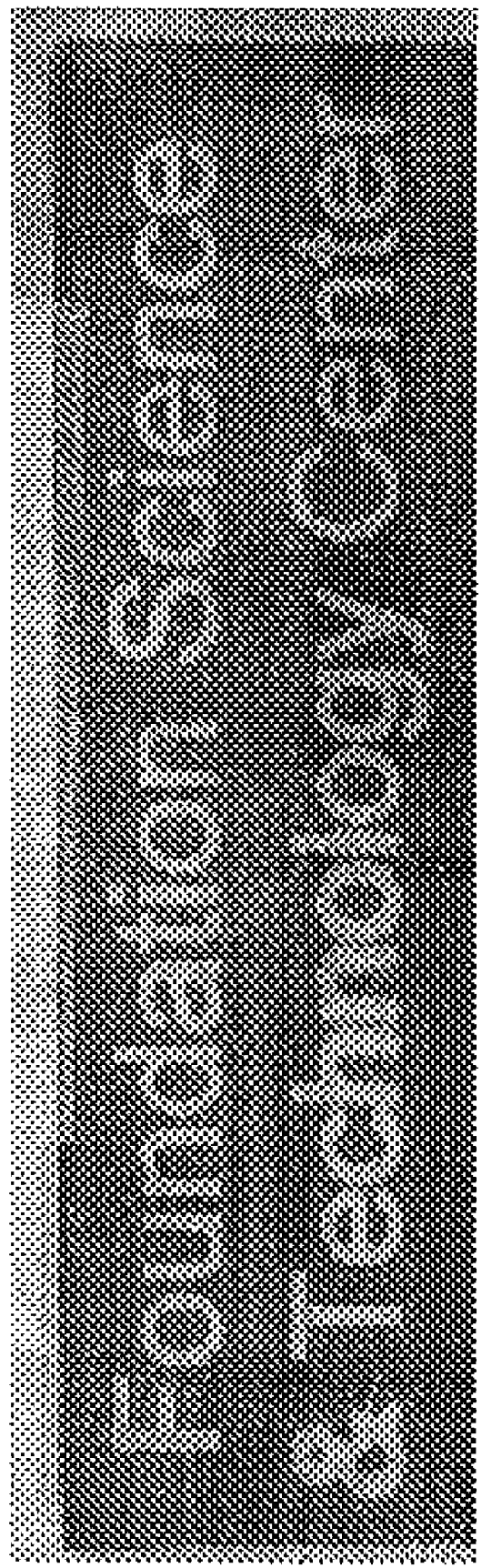
FIG. 2 is an image obtained while carrying out Example 1 below.

The resulting imaging element was exposed through a mask made from a xerographic transparency using fluorescent lighting under 400 nm wavelength as illustrated in FIG. 1. The exposed regions provided an image as the % light transmission was reduced from 37% to about 8% in those regions. This indicates that the exposed regions (image) had a change in the index of refraction due to the reaction of the reactant and sensitizer in the imaging layer. The resulting image is shown in FIG. 2.

The invention has been described in detail with particular reference to certain preferred embodiments thereof, but it will be understood that variations and modifications can be effected within the spirit and scope of the invention.

The invention claimed is:

1. An imaging element consisting essentially of a single, two-phase imaging layer comprising:
    a polymeric binder that is substantially transparent to incident actinic radiation and thus has an index of refraction that is unchangeable as a result of exposure to said incident actinic radiation, said polymeric binder comprising a continuous phase,
    a particulate material comprising a reactant, said particulate material being dispersed within said polymeric binder continuous phase and that:
    a) has an index of refraction that is substantially the same as that of said polymeric binder continuous phase before exposure to said incident actinic radiation, and upon exposure to said incident actinic radiation, the index of refraction of said particulate material becomes substantially different from that of said polymeric binder continuous phase, or
    b) has an index of refraction that is substantially different from that of said polymeric binder continuous phase before exposure to said incident actinic radiation, and upon exposure to said incident actinic radiation, the index of refraction of said particulate material becomes substantially the same as that of said polymeric binder continuous phase,
    that is capable of producing an optically detectable image from differential light scattering in said single, two-phase imaging layer.

2. The imaging element of claim 1 wherein said particulate material further comprises a sensitizer that is capable of absorbing said incident actinic radiation and promoting a photochemical reaction with said reactant to cause a change in said index of refraction of said particulate material.

3. The imaging element of claim 1 wherein said reactant can be converted to a product with a substantially different refractive index in a chemical reaction initiated by exposure of said reactant to said actinic radiation.

4. The imaging element of claim 2 wherein said reactant can be converted to a product with a substantially different refractive index in a chemical reaction initiated by exposure of said sensitizer to said actinic radiation.

5. The imaging element of claim 3 wherein said reactant is a capable of undergoing one of the following transformations:

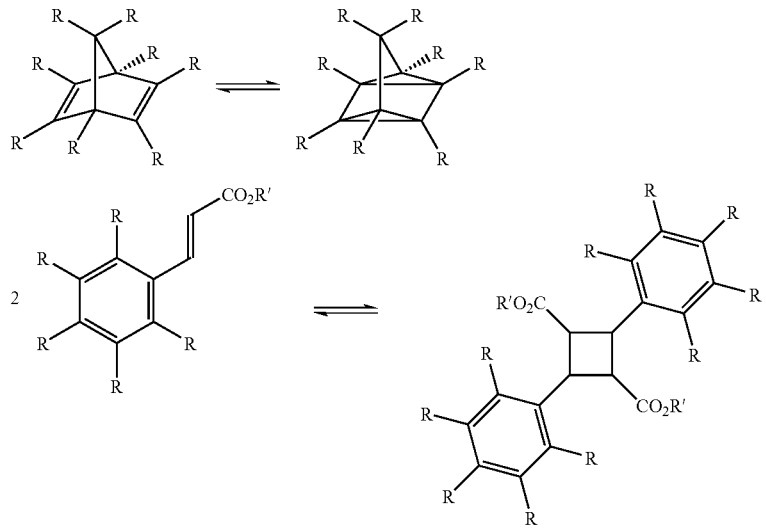

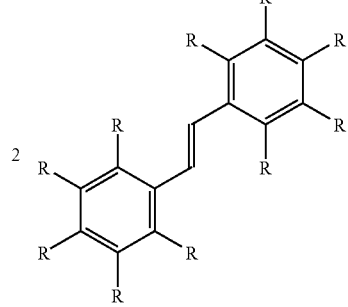
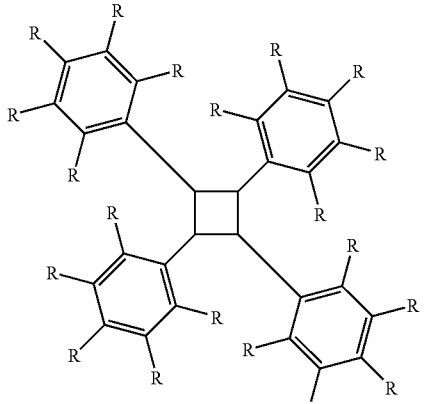

or

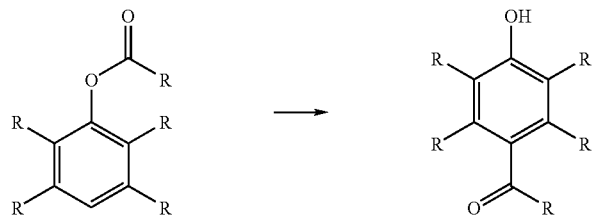
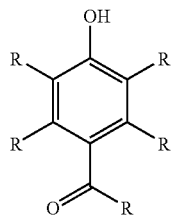

or
  wherein R represents hydrogen, a substituted or unsubstituted alkyl, cycloalkyl, or alkoxy group having from 1 to 12 carbon atoms, a cyano group, a carboxylate group, a halogen, a ketone, an ester, or a substituted or unsubstituted aromatic or heteroaromatic group having from 6 to 18 atoms in the ring, or two or more R groups can be joined together to form an additional ring system, and
  R' represents hydrogen, a substituted or unsubstituted alkyl or cycloalkyl group having from 1 to 12 carbon atoms, or a substituted or unsubstituted aromatic or heteroaromatic group having from 6 to 18 atoms in the ring.

6. The imaging element of claim 4 wherein said reactant is capable of undergoing one of the following transformations:

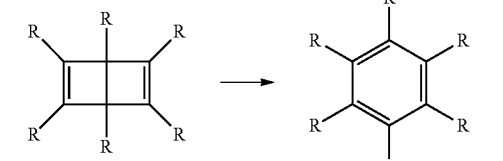

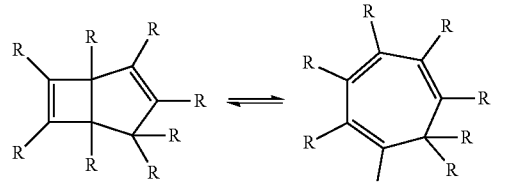

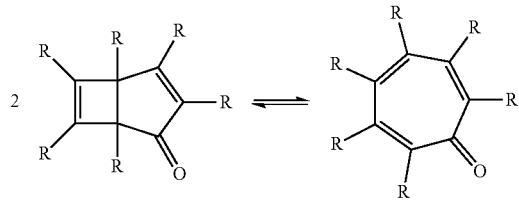

-continued

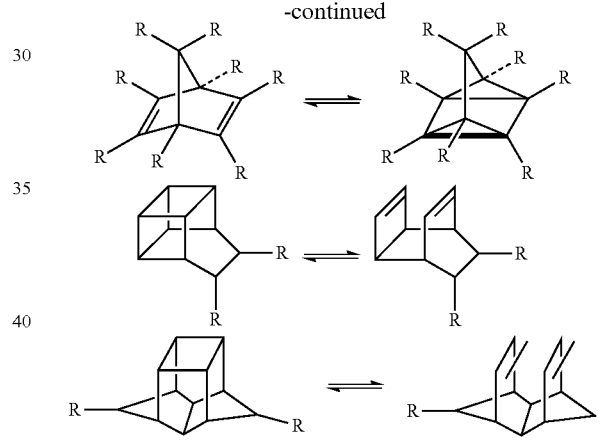

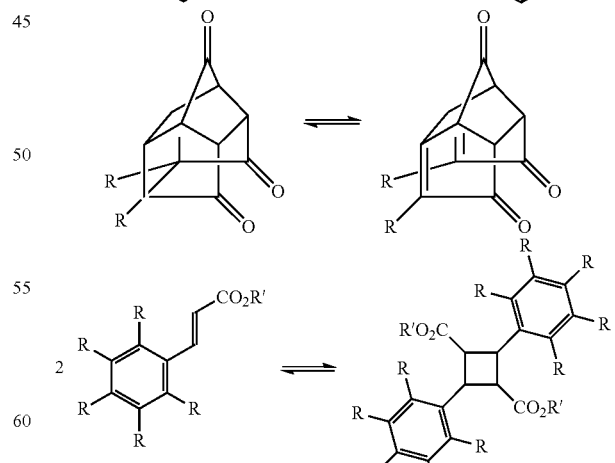

or
  wherein R represents hydrogen, a substituted or unsubstituted alkyl, cycloalkyl, or alkoxy group, a cyano group, a carboxylate group, a halogen, a ketone, an ester, or a substituted or unsubstituted aromatic or heteroaromatic group, or two or more R groups can be joined together to form an additional ring system, and R' represents hydrogen, a substituted or unsubstituted alkyl or cycloalkyl group, or a substituted or unsubstituted aromatic or heteroaromatic group.

7. The imaging element of claim 2 wherein said sensitizer is a cyanoaromatic compound, aromatic anhydride or imide, condensed pyridinium salt, a pyrylium salt, a thiapyrilium salt, a cyanine dye, a quinone having electron withdrawing moieties, an aromatic ketone, a xanthone derivative, a thioxanthone derivative, or a ketocoumarin derivative.

8. The imaging element of claim 1 wherein said polymeric binder is a gelatin or poly(vinyl alcohol).

9. The imaging element of claim 1 wherein said particulate material is present in said single, two-phase imaging layer in an amount of from about 1 to about 50% based on total dry single, two-phase imaging layer weight.

10. The imaging element of claim 9 wherein said particulate material further comprises a sensitizer that is present in said single, two-phase imaging layer in an amount of from about 0.01 to about 10%, both based on total dry single, two-phase imaging layer weight.

11. The imaging element of claim 1 further having a support having said single, two-phase imaging layer disposed thereon.

12. The imaging element of claim 1 that is capable of producing, upon exposure to actinic radiation, a difference in index of refraction between said particulate material and said polymeric binder continuous phase of at least 0.02.

13. A method of producing an image comprising:
imagewise exposing an imaging element to imaging actinic radiation, said imaging element consisting essentially of a single, two-phase imaging layer comprising:
a polymeric binder that is substantially transparent to incident actinic radiation and thus has an index of refraction that is unchangeable as a result of exposure to said incident actinic radiation, said polymeric binder comprising a continuous phase,
a particulate material comprising a reactant, said particulate material being dispersed within said polymeric binder continuous phase and that:
a) has an index of refraction that is substantially the same as that of said polymeric binder continuous phase before exposure to said incident actinic radiation, and upon exposure to said incident actinic radiation, the index of refraction of said particulate material becomes substantially different from that of said polymeric binder continuous phase, or
b) has an index of refraction that is substantially different from that of said polymeric binder continuous phase before exposure to said incident actinic radiation, and upon exposure to said incident actinic radiation, the index of refraction of said particulate material becomes substantially the same as that of said polymeric binder continuous phase,
to provide exposed and non-exposed regions in said single, two-phase imaging layer so as to provide a difference in index of refraction between said exposed and non-exposed regions, and thereby provide an optically detectable image from differential light scattering in the single, two-phase imaging layer.

14. The method of claim 13 wherein said particulate material further comprises a sensitizer that is capable of absorbing said incident actinic radiation and promoting a photochemical reaction with said reactant to cause a change in said index of refraction of said particulate material.

15. The method of claim 13 wherein said particulate material further comprises a sensitizer that is a cyanoaromatic compound, aromatic anhydride or imide, condensed pyridinium salt, a pyrylium salt, a thiapyrilium salt, a cyanine dye, a quinone having electron withdrawing moieties, an aromatic ketone, a xanthone derivative, a thioxanthone derivative, or a ketocoumarin derivative.

16. The method of claim 13 wherein said polymeric binder is a gelatin or poly(vinyl alcohol).

17. The method of claim 13 wherein said particulate material is present in said single, two-phase imaging layer in an amount of from about 1 to about 50%, and said particulate material further comprises a sensitizer that is present in said single, two-phase imaging layer in an amount of from about 0.01 to about 10%, both based on total dry single, two-phase imaging layer weight.

18. The method of claim 13 wherein said reactant can be converted to a product with a substantially different refractive index in a chemical reaction initiated by exposure of said reactant to said actinic radiation.

19. The method of claim 14 wherein said reactant can be converted to a product with a substantially different refractive index in a chemical reaction initiated by exposure of said sensitizer to said actinic radiation.

* * * * *